United States Patent [19]
Ahlbom

[11] Patent Number: 4,816,998
[45] Date of Patent: Mar. 28, 1989

[54] SELF-PILOTING VEHICLE

[75] Inventor: Sten H. N. Ahlbom, Västra Frölunda, Sweden

[73] Assignee: AB Volvo, Sweden

[21] Appl. No.: 451,509

[22] Filed: Dec. 20, 1982

Related U.S. Application Data

[63] Continuation of Ser. No. 117,588, Feb. 1, 1980, abandoned.

[30] Foreign Application Priority Data

Feb. 5, 1979 [SE] Sweden .................. 7900993
Dec. 17, 1979 [SE] Sweden .................. 7910372

[51] Int. Cl.$^4$ .............................. B62D 1/28
[52] U.S. Cl. ........................... 364/424.02; 180/167; 364/449
[58] Field of Search ........... 180/167, 168, 79, 79.1; 340/23, 24; 364/424, 436, 433; 33/141 R, 141.5, 142, 1 N, 1 PT

[56] References Cited

U.S. PATENT DOCUMENTS

| | | | |
|---|---|---|---|
| 2,674,331 | 4/1954 | Ovshinsky | 180/79.1 |
| 3,586,117 | 6/1971 | Tourneau | 180/79.1 |
| 3,715,572 | 2/1973 | Bennett | 340/23 X |
| 3,797,602 | 3/1974 | Sumida | 180/79.1 |
| 3,901,339 | 8/1975 | Williamson | 180/79 X |
| 3,947,807 | 3/1976 | Tyler et al. | 340/23 |
| 4,044,853 | 8/1977 | Melke | 180/167 |
| 4,094,480 | 6/1978 | Nixon | 364/433 X |
| 4,193,199 | 3/1980 | Whiteley | 33/1 PT |
| 4,215,759 | 8/1980 | Diaz | 364/424 X |
| 4,344,498 | 8/1982 | Lindfors | 180/168 |

FOREIGN PATENT DOCUMENTS 1548362 10/1969 Fed. Rep. of Germany ..... 33/141.5
2236054 1/1974 Fed. Rep. of Germany ........ 340/23

OTHER PUBLICATIONS

"Motor Vehicle Antihijack System", Conference: Proceedings of the First Int. Elect. Crime Countermeasures Conf., Edinburgh, Scotland, (Jul. 18-20, 1973), U.S. Cl. 340-23, XR 340-222.

Primary Examiner—Frank E. Werner
Assistant Examiner—Donald W. Underwood
Attorney, Agent, or Firm—Pollock, Vande Sande & Priddy

[57] ABSTRACT

A self-pivoting vehicle with steering wheel(s) and driving wheel(s), possibly combined, a drive motor and a steering means for pivoting said steering wheel(s). At least one measuring wheel rolls freely against the floor under the vehicle, or two such wheels are journalled at different points on the vehicle for measuring off distances rolled. A computing unit and steering mechanism pivot said steering wheel. The computing unit receives measured values from the measuring wheel(s) for computing the deviation of the vehicle by dead reckoning from a predetermined desired trajectory for the vehicle, and gives off a steering angle signal for deviation correction to the steering mechanism.

3 Claims, 5 Drawing Sheets

SELF-PILOTING VEHICLE

This is a continuation of application Ser. No. 117,588 filed Feb. 1, 1980, abandoned.

The present invention relates to a self-piloting vehicle suitable for self-piloting fork-lift trucks and other mens of conveyance where it is desired to make the vehicle move along a preferably predetermined path which is not track-bound.

Track-bound vehicles have been known for many years. In addition to rail-bound vehicles, the general category of track-bound vehicles can also include vehicles which, without being mechanically forced to follow the path, are arranged so that the vehicle follows a track solely intended to be sensed, consisting of a marking on the floor, for example. One type of marking which has become common on floors in industrial buildings in recent years consists of a loop, laid in the floor, which gives off electromagnetic radiation. There is a transducer in the vehicle which senses the position of the vehicle in relation to the "track" and steers the movement into line with the path determined by the "track".

One example of advances in such "track-bound" vehicles, taken in the broadest sense of the term, is described in Swedish Patent Application No. 7709222-9 which specifically deals with the problem of following a curve. Since this type of vehicle normally has four wheels, it is not immediately obvious what is the best method of steering the vehicle to achieve optimum following of a curve. As revealed in said specification, the problem is solved by driving the two wheels in each pair at different calculated speeds. Other solutions, which are simpler in principle, require that the means for sensing the track be placed in front of the front pair of wheels, as viewed in the direction of motion. Such a solution is described, e.g., in U.S. Pat. No. 3,757,887.

Another construction relating to a fork-lift truck, which can perform automatic loading and unloading, is described in Swedish Patent Application No. 7708916-7. The sensor is in this case placed centrally under the vehicle. The description in this application notes that the truck is provided with an odometer for measuring the distance covered by the vehicle. The odometer consists of a toothed wheel, which is fixed to one of the vehicle wheels, and a sensor (not described in detail here) which senses the passage of the teeth past it as the vehicle moves, the distance covered being proportional to the number of teeth passing by.

Practical experience from operation of vehicles such as fork-lift trucks and various types of carts, which follow tracks of the electric loop type, has been quite positive. It has been possible to construct very sophisticated systems, saving both time and labor. It is, however, only natural that, to date, these systems have primarily been used under obviously favorable conditions, i.e., where it was easy to lay out electrical wire paths and where the operational tasks remained relatively constant. Such conditions are not always present, however. In many cases, it is both difficult and expensive to lay down the path-determining cables, and there may be a need for a flexible system or many different programmed movements for the vehicles, which would involve a rather extensive system of loops, making it difficult, among other things, for the vehicles to keep track of the various signals from the floor without confusing them.

It is therefore a purpose of the present invention to achieve a system in which these disadvantages can be essentially eliminated. With this purpose in mind, the object of the invention is to eliminate this "track-boundedness" in its broadest sense, and to cause the vehicle to follow a predetermined path, which is present as information in some form within the vehicle itself. Therefore, according to the invention, a self-piloting vehicle should function by "dead reckoning", being controlled by use of a combination of data on distance covered and direction.

This does not preclude the necessity of sensing the actual position of the vehicle from time to time. This can be done by one of the known methods. One cannot expect perfect precision when piloting by "dead reckoning", and a periodic "fix" is required. It is also conceivable for the vehicle to follow a 'track' along certain portions of a path, and to operate by dead reckoning along the other portions.

The principle of the functioning of the vehicle can be described briefly as follows.

The vehicle, which has steering wheels and driving wheels, is provided with, for example, two free wheels, rolling along the floor and preferably journalled on axles which are collinear in space and placed on either side of the vehicle. These measuring wheels, which need not be bearing, are each provided with a device for measuring the distance rolled. If the vehicle rolls straight ahead (the simplest case), the measured distances will be the same, but if the vehicle moves along a curved path, the measured values will be different. It is possible to determine the actual position of the vehicle from these data, provided the data are continuously recorded. In practice, the distances rolled will be measured at predetermined intervals, sufficiently short so that the distance covered during each interval can be approximated accurately as an arc of a circle. The dead reckoning is then in principle a description of the trajectory covered, determined by summation of such arcs with varying radii of curvature, whereby the position at any moment can be calculated. It is also possible to arrange the distance measurement in ways other than via two non-pivoted wheels, as will be explained hereinbelow. First, the function of the embodiment described above will be discussed.

If we assume that during movement along an arc of a circle, the measuring left wheel of the vehicle rolled a distance $\Delta x_v$ and the right wheel $\Delta x_h$, and that the distance between the wheels is a, then it can be demonstrated by elementary geometric relations that the length of the arc covered, with radius R and covering angle $\alpha$ from the center of curvature, can be written:

$$R\alpha = \frac{\Delta x_h + \Delta x_v}{2} \tag{1}$$

while the radius of curvature is obtained from the equation $$R = \frac{a}{2} \cdot \frac{\Delta x_h + \Delta x_v}{\Delta x_h - \Delta x_v} \tag{2}$$

There are several conceivable methods of steering the vehicle along a certain trajectory. By virtue of the fact that the coordinates of the vehicle are known in one system of coordinates, its position and direction can be determined in every other system of coordinates by transformation. A simple steering principle could focus on a point which is fixed in relation to the vehicle's own coordinates, located in front of the vehicle in the direction of motion, and compute the deviation of the point from a command trajectory in fixed relation to the two-dimensional space of the floor plane, and allow the distance between the point and the command or reference trajectory to determine the angular position of a steering wheel. This steering principle is known in devices with "tracks" consisting of wires in the floor by the colloquial expression "the thumb in the track". The steering equation can then be made quite simple, and the angle for the wheel which steers the vehicle can be made directly proportional to the determined deviation between the computed, vehicle-fixed point and the trajectory which one wishes to follow.

According to a preferred steering method, however, better use is made of the measured values obtained from the two measuring wheels, and especially information on the angular orientation or attitude of the vehicle in relation to the command or reference trajectory. If we assume that the attitude at the beginning of a measuring interval of said short type, in which the movement can be approximated by an arc of a circle, is $\phi_1$, and at that end is $\phi_2$, and that the distance between the command trajectory and the midpoint between the measuring wheels at the beginning of the interval is $s_1$ and at the end of the interval is $s_2$, and that the command trajectory with respect to its radius corresponds to a base value for the steering wheel angle of $\delta_g$ at the end of the interval, we can compute a new, suitable value $\delta$ for the steering wheel angle by the equation $$\delta = a \cdot \phi_2 + b \frac{\phi_2 - \phi_1}{\Delta t} + c \cdot s_2 + d \frac{s_2 - s_1}{\Delta t} \quad (3)$$
$$+ \phi_2 e \begin{cases} e = 1 \text{ if } s_2 \text{ and } \phi_2 \text{ have the same sign} \\ e = 0 \text{ otherwise} \end{cases}$$
$$+ f \cdot (\delta_g - \delta_a)$$

where a, b, c, d, e and f are constants in the steering equation, $\Delta t$ is the length of the time interval, and $\phi_a$ is the actual value of the steering wheel angle.

If the constants in this steering equation are appropriately adjusted, a stable and even following off normally occurring trajectories results.

Normally, the command or reference trajectory is set up as a series of sequential segments consisting of straight lines and circular arcs which are to be followed by the self-piloting vehicle, and the information supplied successively by the two measuring wheels enables the vehicle to guide itself along the trajectory. If the path is closed, it is suitable that a part thereof, preferably a straight portion, be provided with a marking in the floor, of previously known type, for fixing or updating the coordinates.

When determining the path it may be advisable, especially for relatively small radii of curvature, not to allow the path to make a direct transition from a straight section, for example, to a certain radius of curvature. This is because of the sudden lateral acceleration which would be caused by such a change, with resultant stresses on the vehicle and its load. A corresponding problem has faced railway designers, and the solution found there can also be suitably applied to track-less vehicles. A so-called transition curve is used, in which the derivative of the curvature is constant, and the solution to this problem in a rectangular Cartesian coordinate system is a third degree differential equation. See the article "Krümmungsverhältnisse der Eisenbahnen" in Lueger: "Lexicon der gesamten Technik", second edition (1904).

According to a presently preferred example, the self-piloting vehicle is a fork-lift truck with two measuring wheels and a steering wheel means, functioning in principle as a third, single steering wheel but composed of two wheels connected by a tie rod device, and both of which are also drive wheels, pivotable by means of a steering arrangement. Since there are two steering wheels, it is suitable when making the computations to use, instead of the actual steering angles of the two wheels, a theoretical steering angle for an imaginary, single wheel with the same placement on the vehicle. Since each such theoretical steering angle corresponds to an actual recorded steering angle position, it is suitable to set up a simple variable transformation, which in the example is carried out by means of a function table fed into a control computer, but which can be accomplished by a simple mechanical nomograph or by another similar method.

It should be noted that the measuring wheels need not be bearing wheels. They can be completely independent free wheels. Nor is it necessary that they have collinear axes of rotation. Rather, they can be staggered in relation to the primary forward direction of the vehicle. Actually, it is not even necessary that the axles of the measuring wheels be parallel, if they are arranged so that a movement parallel to the respective axle results in slipping without rotation. It can then be suitable to supply the peripheries of the wheels with rollers or the like, with axles oriented in the local direction of the circumference, to facilitate such slipping. A measuring wheel which slips in one direction and rotates in a direction perpendicular thereto is known in planimeters.

Another method of measuring a path covered in two dimensions is to arrange a "ball" in a seating provided with rollers against which the ball rolls, as the vehicle moves, as much as possible without slipping against the rollers. If a measuring wheel is arranged, which measures, without slipping, all movements along two great circles to the seating of the ball, values for the movement can be obtained in two different directions. If these great circles are perpendicular to each other, the movement can be registered along an x and a y coordinate, perpendicular to each other.

Still another method of keeping track of the path covered by the vehicle is to use, instead of two fixed measuring wheels, a single, freely pivotable wheel, for which the rolled-off distance is measured as well as the angular position at each moment. As will be evident from the discussion below, the measured values obtained thereby can be treated in a rather analgous manner.

An example will now be described in connection with the drawings.

Figure 1:
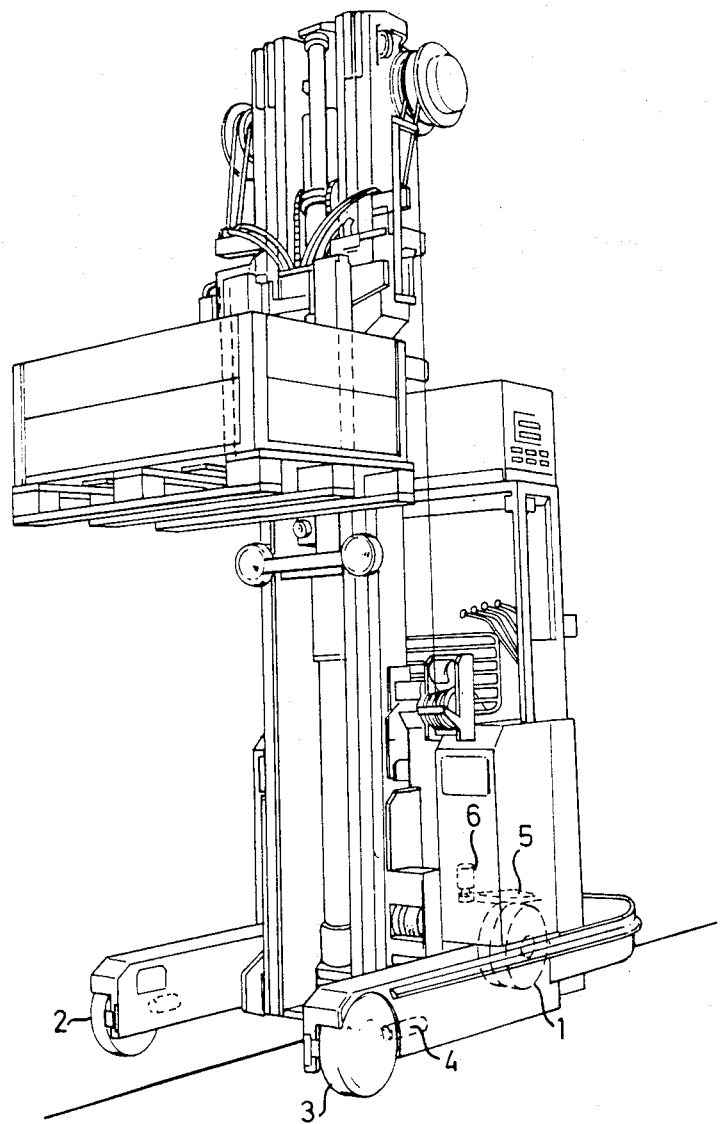
FIG. 1 shows a fork-lift truck of the type used.

FIG. 1 shows a fork-lift truck of essentially conventional type, which therefore need not be described in detail here. In principle, the vehicle functions as a three-wheeled vehicle, even though the steering wheel 1 actually consists of two wheels (not shown) arranged close to each other and connected by a tie rod. Two parallel, non-driven wheels 2,3 with thick rubber tires carry the vehicle together with wheel 1.

Wheels 2 and 3 are provided with toothed rims, which are not visible in this figure and are sensed by a sensor 4. It can also be seen in the figure that the steering wheel 1 is steered via a steering means with a gear 5 and a steering motor 6 acting on said gear.

Figure 2:
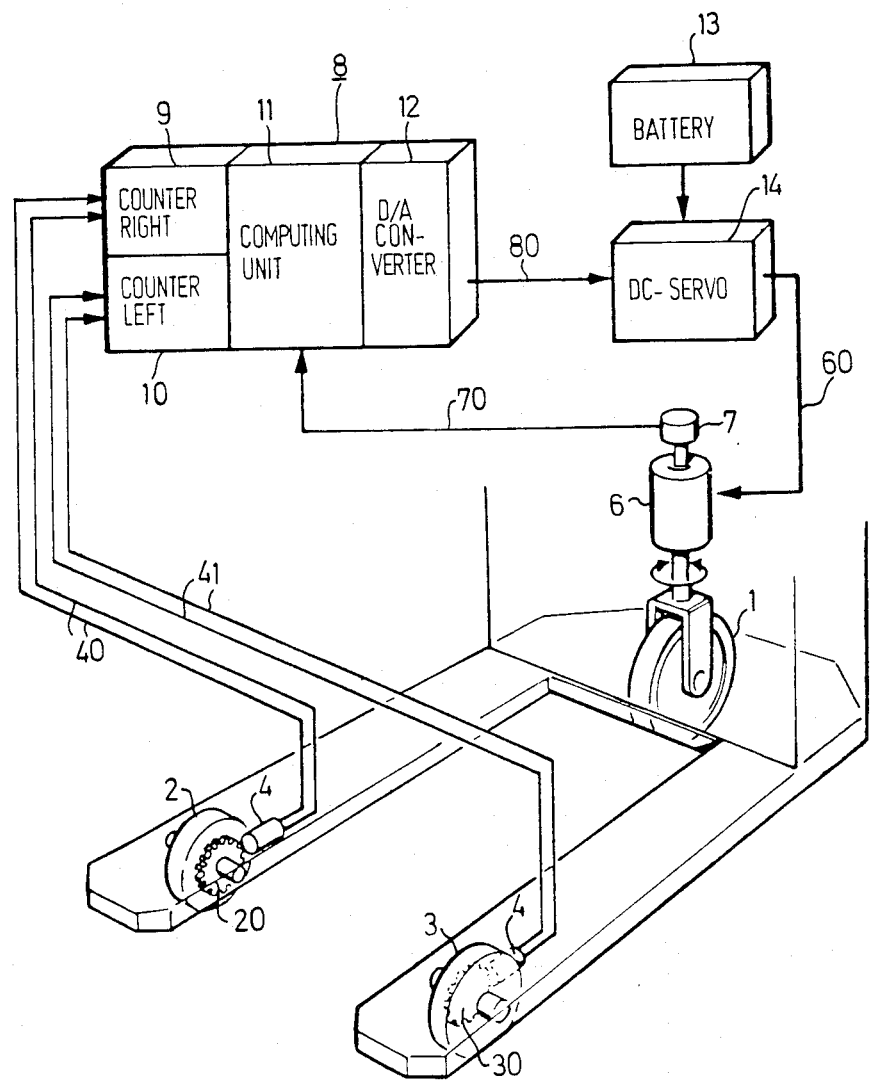
FIG. 2 shows, partially in flow chart form, a three-wheeled self-piloting vehicle, functioning according to the principles of the invention.

The steering arrangement is more clearly shown in the schematic FIG. 2. We see that wheels 2 and 3 have toothed rims 20 and 30, which rotate is solidarity with said wheels. Each toothed rim has a sensor 4, in this case of magnetic type, mounted in the vehicle. Optical sensors can, of course, also be used. Signals from the sensors, corresponding to the direction and length of the movement, pass via the pairs of conductors 40 and 41, respectively, to counting mechanisms for the right and left-hand wheels, respectively. The counting mechanisms are located in a central unit 8 and are designated 9 and 10. A computing unit 11 performs computations according to the equations (1), (2) and (3) above, and computes with the aid of a programmed trajectory what the steering wheel angle setting should be. The information, which up to now has been computed digitally, is converted in a D/A converter 12 and is transferred via a line 80 to a DC servo 14 supplying driving current to the motor 6 which turns the steering wheel 1 to the appropriate angular position. The wheel 1 is also provided with driving power for propelling the vehicle (not shown in the figure).

The actual angular position of the steering wheel is sensed by a digital sensor 7 which can be of the same general type as the combination used for the measuring wheels.

The functioning of the device in FIG. 2 can be described as follows. When the vehicle moves, the front wheels turn. Each wheel has a sensor 4 which generates a pulse train indicating the direction and size of the movement. The pulse train is sent to a 8-bit counter 9 or 10 which counts up for forward movement and down for backward movement.

With their 8-bits, the counters cover the range of integers 0–255 (decimally). Thus, when the vehicle moves forward there is an overflow when the counter exceeds 255. The counter then starts back at 0. A corresponding shift occurs for backward movement: when the counter reaches 0, the next reading will be 255 if the movement continues backwards.

The counters are coupled to the computer via an 8-bit parallel input (per counter) or in another suitable manner. With the aid of successive readings, the computer can then determine the movements of the wheels.

The weakness of this system is that the computer cannot say with certainty in which direction the wheel has turned. Assume, for example, that a counter has at one reading the value 0. At the next reading the value is 110. In this case, has the wheel moved forwards so that the counter has counted 0, 1, 2, . . . 99, 100, or backwards, counting 0, 225, 254, . . . 101, 100? This problem is solved by having a reading frequency by the computer and a resolving power of the counter readings such that, when presented with the choice between two possible cases, the computer always makes the correct choice. A solution used in the case in question is to make the readings so frequent that one knows with certainty that the wheel has not moved more than half of the integer range of the corresponding counter. The following computational method was used:

$x_1$ = counter value at reading 1
$x_2$ = counter value at reading 2
$\Delta x$ = wheel movement (pos forward, neg backward)

if $x_2 - x_1 \geq 0$  $|x_2 - x_1| \geq 128$ then set $\Delta x = x_2 - x_1 - 256$ $|x_2 - x_1| < 128$ then set $\Delta x = x_2 - x_1$ if $x_2 - x_1 < 0$  $|x_2 - x_1| \leq 128$ then set $\Delta x =$ $+(x_2 - x_1 + 256)$ $|x_2 - x_1| < 128$ then set $\Delta x = x_2 - x_1$ The following is a short general description of the program for computing the steering wheel angle from the front wheel counter data.

Initiating:
 $\phi_1 = 0$
 $s_1 = 0$
 $\Delta x_h = 0$
 $\Delta x_v = 0$
 $\delta_g = \arctan(d/R)$
 $\Delta t = 0$ Loop:
 read wheel counters and clock
 accumulate $\Delta x_h, \Delta x_v, \Delta t$
 compute $K = (\Delta x_h + \Delta x_v)/2$
 compute $\alpha = (\Delta x_h - \Delta x_v)/a$
 compute $\beta = K/R$
 if $K \geq$ the preset computational interval:
  compute $\phi_2 = \phi_1 + \alpha - \beta$
  compute $s_2 = s_l + K(\phi_1/2 + \phi_2/2)$
  compute $\dot\phi_2 = (\phi_2 - \phi_1)/\Delta t$
  compute $\dot s_2 = (s_2 - s_l)/\Delta t$
  compute $\delta = \ldots$
  set $\phi_1 = \phi_2$
   $s_l = s_2$
   $\alpha = 0$
   $\beta = 0$
   $\Delta x_h = 0$
   $\Delta x_v = 0$
   $\Delta t = 0$
end loop.

It will be clear from the foregoing that K is equal to $R\alpha$ of equation (1) and, being the mean of the distances the two wheels have rolled, gives the distance which the midpoint between the wheels has moved between two samplings. $\alpha$ is the angle which the axis uniting the two wheels has swing between the two samplings. A comparison with equations (1) and (2) shows that $\beta$ is then the angle which the midpoint between the wheels has covered in relation to the center of curvature.

As can be seen from the above, it is desirable that the sensor 4 can indicate both the number of teeth on the gears 20 and 30 and the direction in which the measuring wheels turn. Sensors with such a function are known, in which there are two sensor components which detect the teeth with a certain phase displacement, so that the direction is immediately obtainable. In the example described, a commercially available sensor called Airpax 14-0002 (manufactured by Airpax Electronics, Inc., Fort Lauderdale, Fla. was used.

Figure 3:
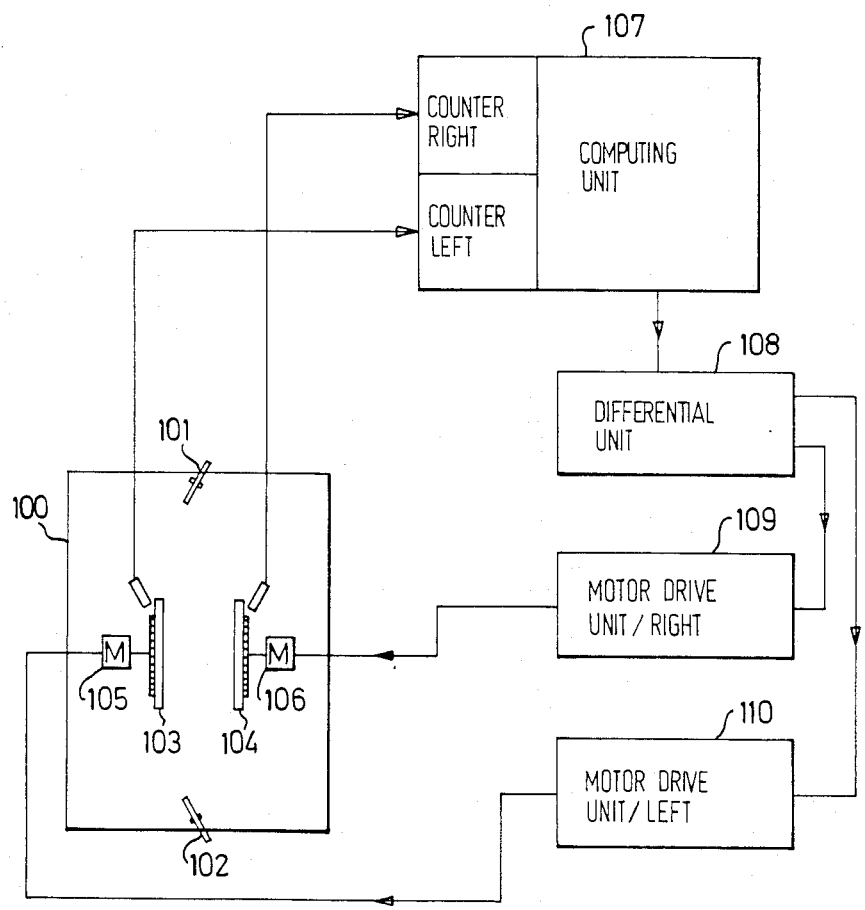
FIG. 3 shows an alternative embodiment.

Another embodiment is shown in FIG. 3, in which, instead of using the construction with two non-pivoting supporting wheels and a steering wheel, driving and steering is done at the same time through two wheels 103 and 104, each with an individual motor 105,106. The two wheels serve at the same time as measuring wheels and are provided with toothed rims and sensors as in the previous example. In the vehicle 100, there are two wheels 101, 102, placed at the ends, which are namely free-wheeling, freely pivoting wheels. This example is primarily intended to demonstrate that the invention is also applicable where the steering is effected by differential driving of two wheels on collinear axles, but in many cases it may be advisable to accord the measurement and driving functions to separate wheels, in view of the risk of error due to slippage of a driving wheel.

The computing function in the example shown in FIG. 3 is fairly analogous to the preceding, in that the dead reckoning is performed by sampling counters, in a computing unit 107, which are coupled to measuring wheels. For this special case, the steering must be done by differential control of the motors 105 and 106 which requires a differential unit 108 producing two output signals, one to each of the motor drive units 109,110. Turning is thus accomplished by differential feed to the two motors, and if they receive the same feed with opposite signs, the vehicle 100 will turn about a point located half-way between the wheels 103 and 104.

Figure 4:
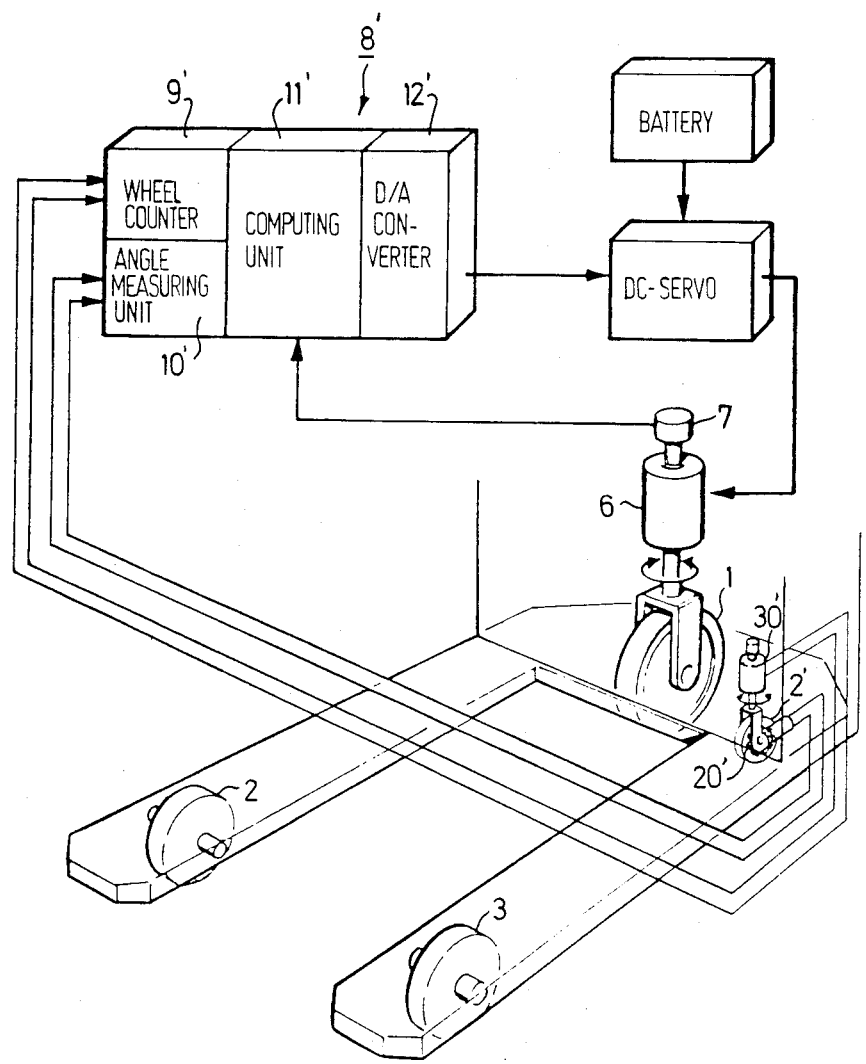
FIG. 4 shows an alternative embodiment in which the movement of the vehicle is measured with a pivotable wheel provided with angle measuring means.

FIG. 4 shows an embodiment in which a pivoting measuring wheel 2' is used, provided with an angle measuring means 30'. As in the previous examples, the measuring wheel is provided with a toothed rim 20' and corresponding measuring means for rolled distance. The processing unit 8' has an angle measuring unit 10' and a wheel counter 9'. The function of the computing unit 11' is of course somewhat different, and this will be explained with reference to FIG. 5.

Figure 5:
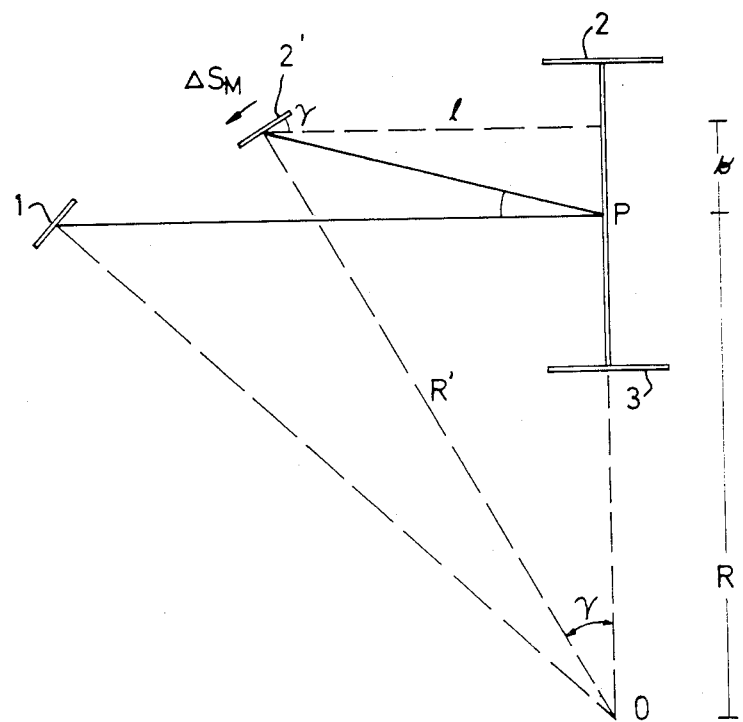
FIG. 5 is a diagram showing how the pivotable wheel according to FIG. 4 is used to determine the curvature of the vehicle motion and the distance covered.

FIG. 5 shows schematically how the measurement is done. As can be understood from the above scheme for the computer program, it is sufficient if, instead of $\Delta x_h$ and $\Delta x_v$, we use the values $K$, $\alpha$ and $\beta$, which can be calculated from the two measured values obtained from the measuring wheel 2', namely the rolled distance $\Delta S_M$ and the angle $\gamma$ according to the figure, during the period $\Delta t$.

We see from FIG. 5 that the wheel 2' forms an angle $\gamma$ with the main axis of the vehicle. In order to be able to use the same computational system for the two wheel measurement, we must now employ a transformation of coordinates, so that displacement during the time $\Delta t$ registered with the two values $\Delta S_M$ and $\gamma$, will be able to be expressed in terms of the component $K$ for forward displacement of the vehicle, its angle of rotation $\beta$ around the center of rotation 0 and its angle of rotation $\alpha$ around the vehicle-fixed midpoint P between the wheels. From FIG. 5 it can be seen that the following relations apply:

$$K = \Delta S_M \cos\gamma$$

$$\beta = \frac{\Delta S_M}{R'} = \frac{\Delta S_M \sin\gamma}{1}$$

$$\alpha = \frac{\Delta S_m \sin(\gamma + v)}{\sqrt{l^2 + b^2}}$$

We see that l, b and v are constants and are only dependent on the placement of the wheel 2' in relation to the wheels 2 and 3, and that the above equations can only be applied to a pivotable wheel. The person skilled in the art will understand that the wheel 2', in practice, must have a pivot axis in the vehicle which does not intersect with the axle of the wheel, since otherwise the wheel 2' will not follow the movement, and that the above calculations will be somewhat more complicated since the distance between the pivot axis of the wheel and its axis of rotation must be taken into account.

The most important characteristic of the invention lies in the fact that it is periodically determined how the vehicle has actually changed its position and attitude and allowing the steering of the vehicle to be affected thereby. Thus the mechanisms shown should not be regarded as being delimiting for the invention, since a number of different types of steering means and measuring means can be used in a vehicle constructed according to the principles of the invention.

In the embodiment discussed first, the distance between wheels 2 and 3 was 1.129 m and the distance between a line joining said wheels, on the one hand, and the steering wheel 1, on the other, was 1.435 m. Suitable constants for the steering equation (3) were determined by simulation in an analog computer. The constants determined thereby were a=2.4, b=0.7, c=1.4, d=0.6, e=1.0 and f=0.6, expressed in rational metric units.

Tests have demonstrated that it is possible to achieve practically sufficient steering precision with the invention. A closed path with several curves was used, with a total length of about 100 m. A marking line was drawn at one place in the path, and it was detected during every lap to update the computer. The error of the position of the vehicle computed by dead reckoning was at most about 30 cm, in spite of the long length of the path, laid out on an industrial floor which was not at all ideal.

Due to the fact that the present invention takes into account not only the movement of the vehicle but its attitude as well, it is different from vehicles following a railway-like track. It is therefore essential that one understands the difference between following a predetermined track, defined as definite data on how the wheels take their curves; and following a predetermined trajectory, which means that a certain fixed point of the vehicle follows a certain two-dimensional curve. Thus, requiring the following of a track gives fewer degrees of freedon than requiring the following of a trajectory, in accordance with this definition.

What I claim is:

1. In a vehicle which is self-piloting including a steering mechanism for controlling said vehicle motion, a control system for providing steering commands to said vehicle comprising:

means for measuring the change in position of said vehicle in two coordinates including first and second spaced apart free wheels which rotate in response to vehicle movement, and first and second sensors for providing pulses in response to a given rotation of said wheels;

a computer connected to receive position change pulses from each of said sensors, said computer including a programmed trajectory for said vehicle, said computer programmed to calculate from said pulses (a) a change in attitude $\Delta\phi$ travelled by said vehicle during a time $\Delta t$ as $(\phi_1-\phi_2)/\Delta t$ where $\phi_1$ is the attitude at the beginning of Δt, and $\phi_2$ the attitude at the end of Δt, (b) a change in side error in time Δt as $S_1 - S_2$ where $S_1$ and $S_2$ are the distances between the midpoint of the wheels and the programmed trajectory at the beginning and end of Δt, and (c) a steering angle from said change in attitude and side error; and motor drive means coupled to said steering mechanism and connected to receive a signal from said computer representing said steering angle whereby said vehicle trajectory is controlled to follow said programmed trajectory.

2. In a vehicle which is self-piloting including a steering mechanism for controlling said vehicle motion, a control system for providing steering commands to said vehicle comprising:

means for measuring the change in position of said vehicle in two coordinates including first and second spaced apart free wheels which rotate in response to vehicle movement, and sensors connected for providing pulses in response to a given rotation displacement of said wheels;

a computer connected to receive position change pulses from each of said wheels, said computer including a programmed trajectory for said vehicle, said computer programmed to calculate from said pulses (a) a radius of curvature for an arc R travelled by said vehicle, (b) a length of said arc, (c) a steering angle from said length of arc and radius of curvature, and said programmed trajectory according to $$+ a \cdot \phi_2 + b \frac{\phi_2 - \phi_1}{\Delta t} + CS_2 + d \frac{S_2 - S_1}{\Delta t} +$$

$$\phi_2 e \begin{cases} e = \text{if } S_2 \text{ and } \phi_2 \text{ have same sign,} \\ e_2 = 0 \text{ otherwise,} \end{cases} + f(\delta_g - \delta_a)$$

where $\phi_1$ is the initial attitude of the vehicle at the beginning of said arc, Δt the time of travel over said arc;

$\phi_2$ is the attitude after Δt;

$S_1$ is the distance between the programmed trajectory and midpoint of the wheels at the beginning of said arc;

$S_2$ is the distance between the programmed trajectory and midpoint of the wheels at the end of said arc;

a, b, c, d and f are constants;

$\delta_g = \arctan(1/R)$; and $\delta_a$ is the actual value of steering angle; and motor drive means coupled to said steering mechanism and connected to receive a signal from said computer representing said steering angle whereby said vehicle trajectory is controlled to follow said programmed trajectory.

3. In a vehicle which is self-piloting including a steering wheel controlled by a servo motor to change the trajectory of said vehicle, apparatus for providing steering commands for steering said vehicle along a predetermined trajectory comprising:

first and second spaced apart wheels, each having a rotation sensor located on said vehicle which rotates in response to said vehicle movement, each of said sensors generating a pulse in response to a given angular displacement;

first and second counters for receiving each pulse produced from a respectively connected sensor;

a computer connected to monitor the contents of each of said counters, said computer including a programmed trajectory for said vehicle travel and programmed to compute from said counters' contents (a) the length of arc of travel of said vehicle, (b) the radius of arc of said vehicle, and (c) a new steering angle based on said programmed trajectory and said length and radius of arc; and, digital to analog converter means connected from said computer to said servo motor, whereby a steering angle signal is provided by said computer based upon said vehicle movement and said programmed vehicle trajectory.

* * * * *